United States Patent [19]
Matsumoto

[11] 3,735,500
[45] May 29, 1973

[54] EDUCATIONAL DEVICE

[75] Inventor: Teruo Matsumoto, Tokyo, Japan

[73] Assignee: Epoch Company Ltd., Tokyo, Japan

[22] Filed: Dec. 15, 1970

[21] Appl. No.: 98,382

[52] U.S. Cl. ................................................ 35/9 A
[51] Int. Cl. .............................................. G09b 7/06
[58] Field of Search ........................................ 35/9 A

[56] References Cited

UNITED STATES PATENTS

| | | | |
|---|---|---|---|
| 3,246,402 | 4/1966 | Diamond | 35/9 A |
| 3,538,621 | 11/1970 | Mayeda | 35/9 E |
| 3,609,878 | 10/1971 | Bender | 35/9 A |
| 3,228,118 | 1/1966 | Hirtle | 35/9 A |
| 3,154,863 | 11/1964 | La Prelle | 35/9 R |
| 3,508,349 | 4/1970 | Gilden et al. | 35/9 B |

*Primary Examiner*—Wm. H. Grieb
*Attorney*—Brufsky, Staas, Breiner & Halsey

[57] ABSTRACT

A toy for teaching young children basic educational and social concepts, e.g., arithmetic, time-telling, etc. The subject matter is visually presented as indicia on a movable tape positioned in a cassette. The cassette is adapted to be snapped into a housing and interacts with the battery circuit provided therein. The tape is also coded to program the circuit, acting in conjunction with a keyboard. The tape is advanced only when the correct keyboard button is depressed indicating to the user that the problem has been solved. Different cassettes are provided for each subject matter.

17 Claims, 17 Drawing Figures

PATENTED MAY 29 1973 3,735,500

INVENTOR
TERUO MATSUMOTO

BY Brufsky, Staas,
Breiner & Halsey
ATTORNEYS

EDUCATIONAL DEVICE

BACKGROUND OF THE INVENTION

1. Field of the Invention

This invention relates to teaching toys or educational devices of the type designed to impart favorable attitudes towards problem solving at an early age. More particularly, this invention relates to a battery operated cassette and keyboard device capable of being hand held and carried about. Each cassette carries a coded tape with indicia for displaying questions, problems or the like, relating to one or more subjects.

The term "cassette" used herein refers generically to a tape-holder combination without regard to the particular nature of the tape or its action therein. Magazines or cartridges are included in this category.

2. Description of the Prior Art

Educational devices of all types and degrees of complexity are in use both in homes and in schools. Those devices which, in fact, are more than mere toys but aid in the educational process are looked upon favorably by educators. One of the simplest techniques employed is shown in U.S. Pat. No. 3,154,863 issued Nov. 3, 1964. The well-known flash card principal is employed with the learning process reinforced by requiring some additional effort to be expended in checking the answer.

A more expensive and sophisticated device for teaching spelling and letter identification is disclosed in U.S. Pat. No. 3,508,349 issued Apr. 28, 1970. Here again, printed cards displaying objects and/or words are inserted into an electronic keyboard device. By depressing keys in the proper sequence, lights are actuated to immediately inform the child that his answer is correct.

Other well-known devices employed by educators and parents include tape recorders and slide projectors. All of these devices serve useful pruposes in making education fun. The most effective devices utilize some type of dramatic action to indicate the answer. These, however, are expensive and beyond the budgets of many parents and even school systems with limited budgets for such teaching aids.

OBJECTS AND SUMMARY OF THE INVENTION

A principal object of the present invention is to provide a low-cost teaching device, simple in operation, yet effective in reinforcing the learning process by providing dramatic response to correct answers.

Another object of the present invention is to provide an educational device designed to visually and sequentially present problems in different categories of subject matter.

Another object of the present invention is to provide a battery-operated, portable toy designed for use with reuseable cassettes having a coded web or tape programmed to operate in conjunction with a keyboard whereby the tape is automatically advanced only by actuating the proper keyboard button.

Another object of the present invention is to provide a cassette having a coded tape with indicia displaying subject matter to be learned.

These and other objects of the present invention will become readily apparent from the description which follows and the accompanying drawings.

Briefly, the educational device according to the present invention utilizes a cassette in a housing comprising a keyboard with means to actuate the cassette mechanism and an electric circuit programmed by a tape movably positioned in the cassette. The subject matter to be learned is presented by indicia on the tape seen through a window provided in the cassette. With the cassette in place, the tape is automatically advanced only when the proper keyboard button is depressed indicating a correct answer. By way of example, a simple problem in arithmetic, e.g., $1 + 1 = ?$, may be posed. When No. 2 button is depressed, the tape advances to display a second problem; otherwise the tape remains stationary. Thus, the device of the present invention provides the child with an immediate check of his answer in a dramatic way which helps to reinforce the learning process.

DETAILED DESCRIPTION OF A PREFERRED EMBODIMENT

Figure 1:
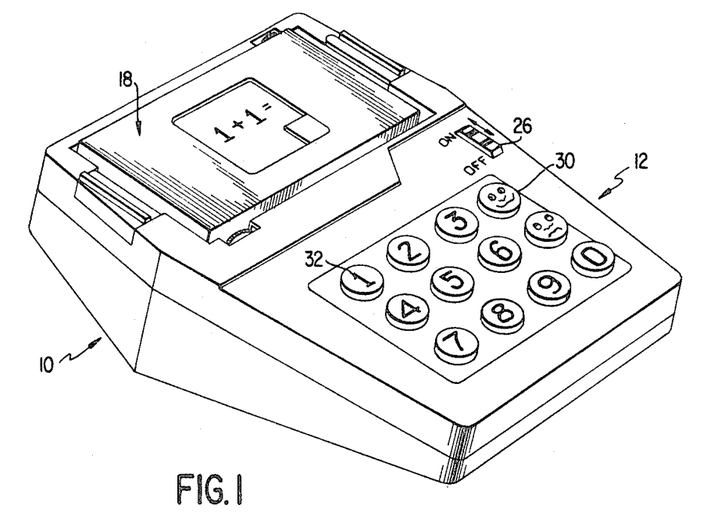
FIG. 1 is a perspective view of an assembled educational device according to the present invention.

Referring now to the drawings wherein like numerals indicate like elements throughout the several views, an embodiment according to the present invention is designated by reference numeral 10 as best shown in FIG. 1.

Figure 2:
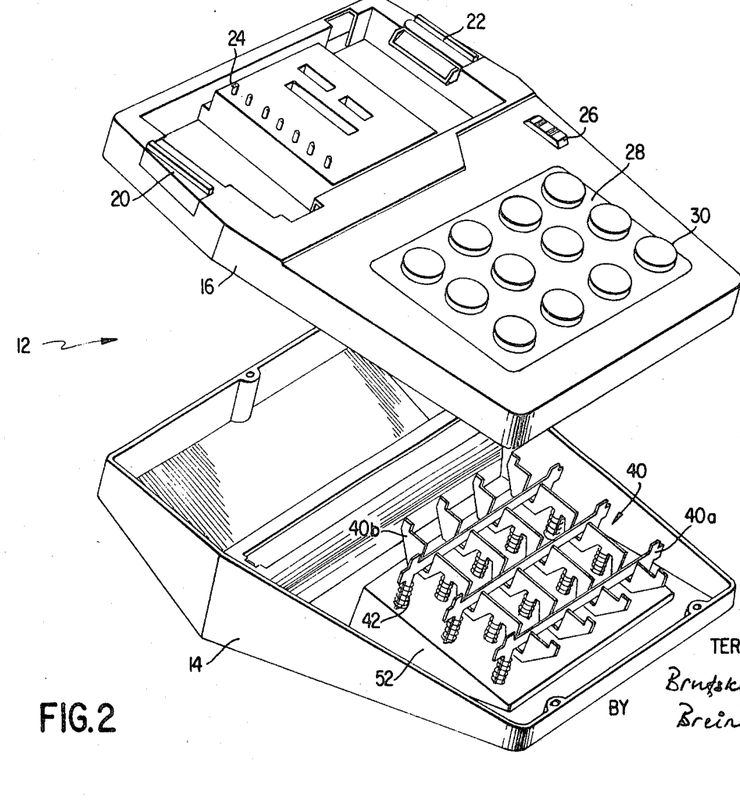
FIG. 2 is an exploded perspective view of the device housing of FIG. 1, partially illustrating the internal construction along the base portion.

In FIGS. 1 and 2, the educational device or toy 10 comprises housing 12 having a base 14 and a securable cover 16 with an upper portion formed to removably receive the cassette 18 therein by means of flange elements or holders 20 and 22, at least one being slideably secured to move in a transverse direction. Intermediate holders 20 and 22, a plurality of spring loaded prongs 24 project outwardly for engagement with the cassette 18 for a reason to be more fully described hereinafter.

The lower portion of the cover 16 is provided with an electrical on-off switch 26 and a keyboard 28 with twelve keys or buttons 30 arranged in three parallel rows, four buttons per row. Indicia 32 (FIG. 1) are provided on the buttons and correspond to possible answers to a given problem. As will be later apparent, the keyboard 28 can be modified to hold more than the 12 buttons shown. Similarly, the arrangement of the buttons can also be varied without departing from the basic utility of the present invention.

Figure 6:
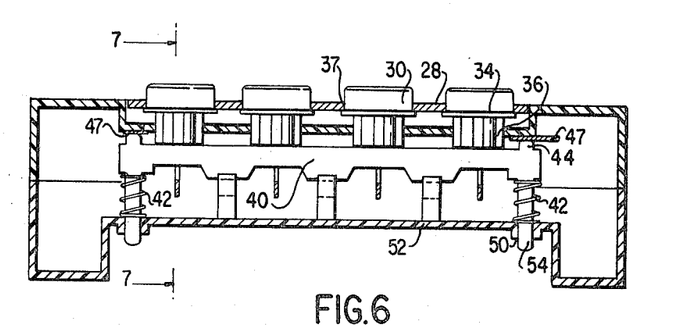
FIG. 6 is a transverse elevational view of the housing cover and a portion of the base illustrating the keyboard-button arrangement, taken along the line 6—6 of FIG. 3, but with the cover in its normal upright position.
Figure 7:
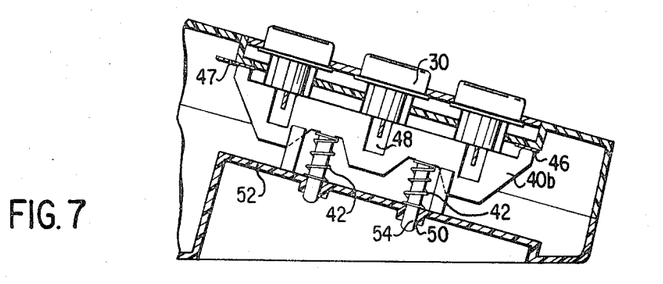
FIG. 7 is a longitudinal elevational view of the housing cover and a portion of the base partly sectioned to illustrate the keyboard-button arrangement taken along the line 7—7 of FIG. 6.
Figure 8:
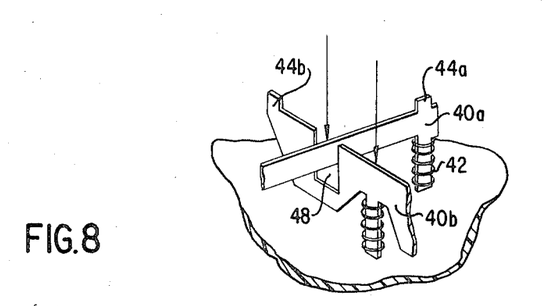
FIG. 8 is a perspective view illustrating the action of a keyboard button (not shown) on intersecting circuit elements therebelow.

To best explain the action of the buttons 30, reference is now made to FIGS. 6-8 where the buttons are shown with a circular rim 34 intermediate the ends and of a diameter larger than the keyboard opening 37 through which the button 30 projects. Rim 34 is positioned adjacent the under surface of the keyboard 28 where it is retained. Below the rim 34 of each button 30 is a depending X-shaped portion 36 which functions to simultaneously actuate intersecting matrix strips designated as 40, as will become more apparent hereinafter. Strips 40 are mounted on springs 42 removably positioned in the lower portion of the base 14.

Figure 3:
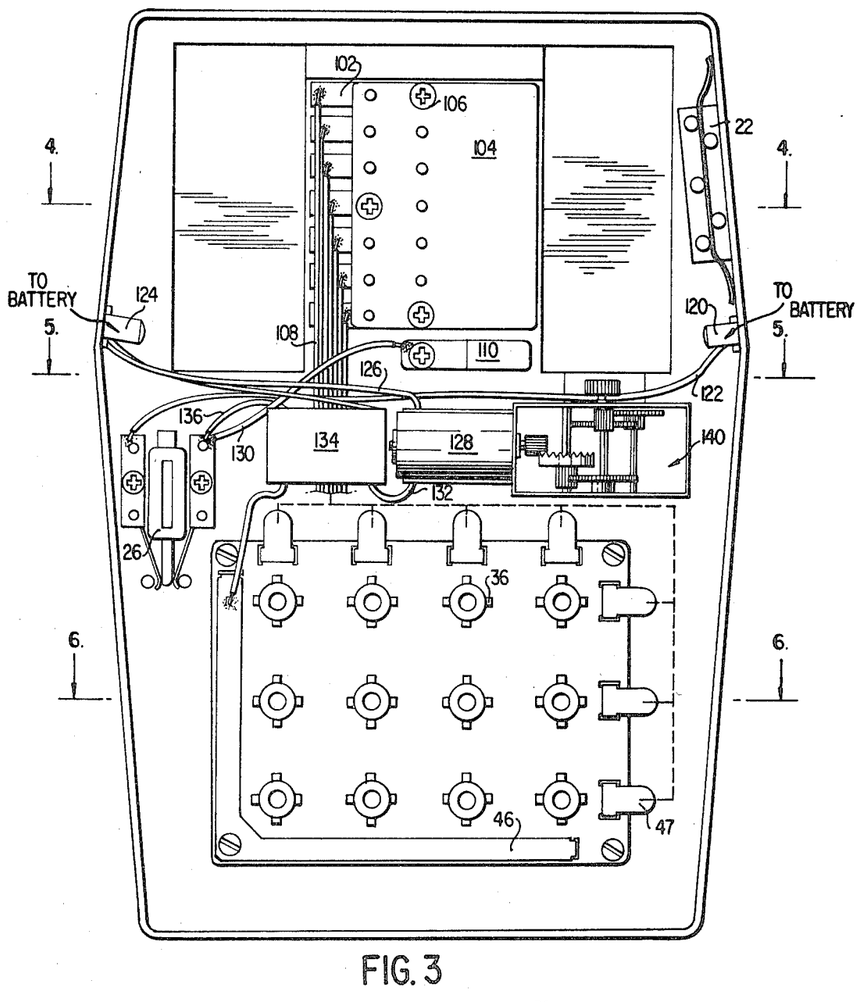
FIG. 3 is an enlarged plane view of the housing cover looking from the inside, and illustrating construction details.

In FIG. 2, the keyboard with the normally hidden matrix strips 40 are best shown. It should be appreciated that when the housing cover 16 is secured to the base 14 by screws, (not shown) the vertical axis of each of the buttons 30 is coincident with the line of intersection of the matrix strips 40. By depressing the button 30, a pair of intersecting matrix strips 40 underlying the button move downwardly as shown in FIG. 8. In this manner, the integrally formed upper tabs 44 of the strip 40 are separated from the electrical contacts 46 and 47 located in the inner surface of the cover 16 as seen in FIG. 3. In the normal undepressed condition, the spring 42 maintains the matrix strip 40 in electrical contact with conducting elements 46 and 47 as in FIGS. 6 and 7.

The matrix strips 40 include four longitudinal members 40b and three transverse members 40a, with the former having spaced notches 48 through which strips 40a pass perpendicular to strips 40b as shown in FIGS. 2 and 6-8. Guide slots 50 formed conventionally in platform 52 of the base 14 receive the flat fingers 54 of each matrix strip 40. Two or more extensions are preferably provided to stabilize the strips.

Figure 12:
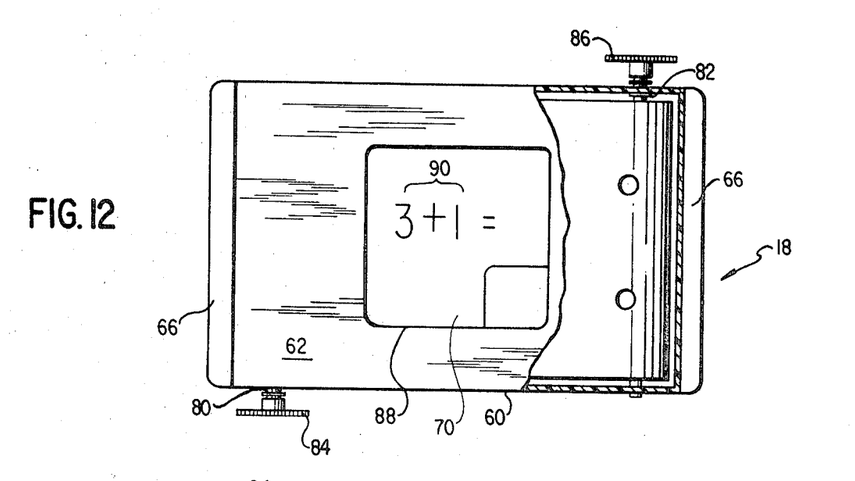
FIG. 12 is a top plan view of a typical cassette according to the present invention, partly sectioned to illustrate the programmed tape therein.
Figure 13:
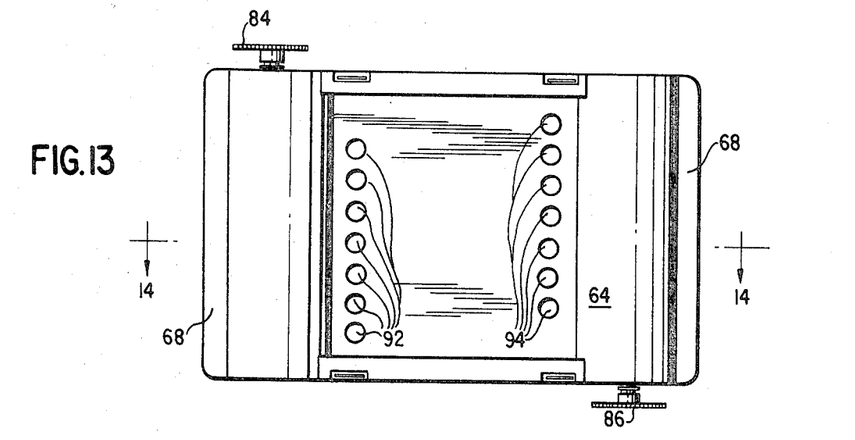
FIG. 13 is a bottom plan view of the cassette shown in FIG. 12.
Figure 14:
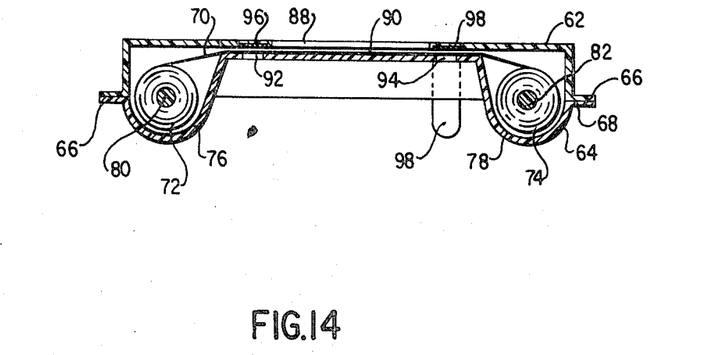
FIG. 14 is a cross-sectional view, taken along line 14—14 of FIG. 13.

In FIGS. 12, 13 and 14, the cassette 18 is shown with a protective case 60 having top and bottom sections 62 and 64, respectively, and terminating in flanges 66 and 68, respectively, retained by holders 20 and 22 within the housing 12. The case 60 contains a coded tape 70 secured on spools 72 and 74, as illustrated in FIG. 14. The tape 70 rotates within wells 76 and 78 formed in the bottom section 64 of the cassette 18 about spindles, each of which has pins 80 and 82 projecting outwardly through the case opening with one end of each pin terminating in a gear 84 or 86, as shown.

The tape 70 is protected by the case 60 and is virtually hidden from view except for a discrete portion which appears through a window 88 provided in the top section 62 of he cassette 18. The tape 70 has indicia 90 selectively positioned to be viewed sequentially. The word "tape" connotes a web or belt of predetermined length. While endless tapes are contemplated, the preferred arrangement is one whereby the ends are secured by adhesive or the like within slots or openings in the spindles (not shown).

Figures 15, 16:
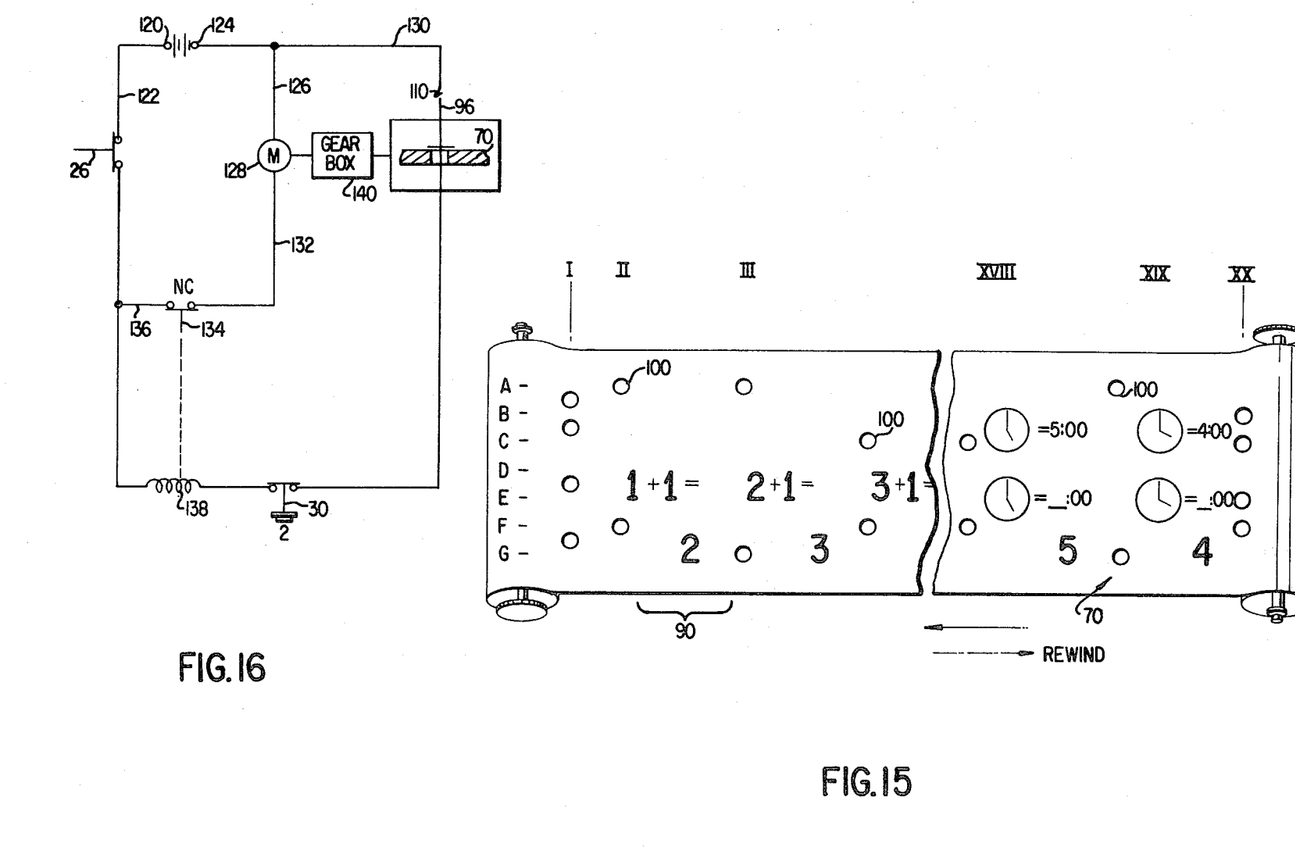
FIG. 15 is a fragmentary plan view of a typical cassette programmed tape with indicia.
FIG. 16 is a simplified wiring diagram of the circuitry according to the present invention.

As illustrated in FIG. 15, for example, the indicia 90 can relate to virtually any subject matter desired. As shown, numbers are depicted on the left side of the tape 70 in a format suited for teaching arithmetic, with illustrations of a clock face on the right side for presenting problems relating to time telling. It will be appreciated that the aforementioned subject matter is merely representative of the variety of subjects which can be taught.

The tape 70 of the present invention is preferably made of paper or, in lieu thereof, a polymer film such as polyethylene or the like. However, any suitable electrically non-conductive material can be employed, or, if a conducting material is used, it must be coated or laminated with an insulating layer on the non-exposed or hidden surface of the tape to provide an electrical barrier between the prongs 24 projecting through holes 92 of the bottom section 64 of the cassette 18 and conductor 96 located within the top section 62 thereof.

Preferably, the window 88 of the case 60 is covered on the inside surface by a transparent film (not shown) to protect the viewing surface of the tape. In operation, the tape 70 traverses the window 88 by moving from right to left from spool 82 to spool 80 through the narrow flattened passageway 90 centrally provided in the cassette 18 behind the window 88. Spaced rows of seven vertically aligned holes 92 and 94, shown in FIGS. 13 and 14, are formed in the rear flat section of bottom section 64 of the cassette 18. The holes are in spaced aligned orientation beneath conductors 96 and 98 secured to the inside front section of the cassette 18 as best seen in FIG. 14.

The toy 10 is programmed by the tape 70 by code means in the form of prepositioned cutouts 100 (FIG. 15) coincident with the holes 92 of the cassette 18 for a reason to be described in greater detail hereinafter. The code means, acting in conjunction with the housing circuitry, controls the tape advance. For purposes of illustration, the tape 70 width is divided into rows A, B, C, D, E, F and G and the length divided into sections designated as I to XX, as shown in FIG. 15.

At positions I and XX the code cutouts 100 provide means for automatically terminating the advance of the tape during rewind and when the last of the problems has been presented. At positions II through XIX, the code cutouts are adjacent each problem permitting the tape to advance only when the user registers the correct answer by depressing the appropriate button 30 on the keyboard 28 (FIG. 1). The cutouts for rewind termination are centered between the rows A, B, C, D, etc. and also aligned with holes 94 formed in the cassette 18. On the other hand, the cutouts for normally advancing the tape 70 are centered on one or more of the rows A, B, C, D, etc. and also aligned with holes 92 formed in the cassette 18.

By this dual arrangement, a convenient way of automatically rewinding the tape 70 is provided. All that is required is the removal of the cassette at the conclusion of the tape and reinsertion in reversed or upside down position. The tape 70 will then be rewound without any further effort on the part of the user.

Figure 9:
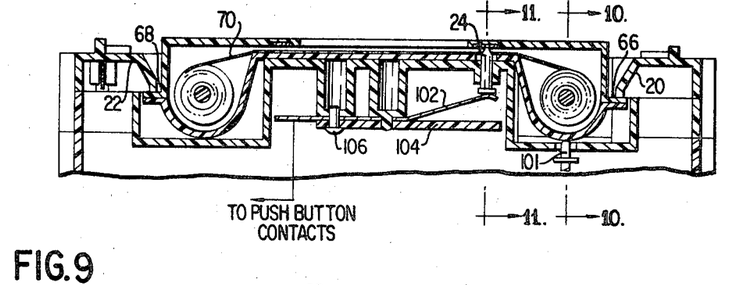
FIG. 9 is a transverse elevational view similar to that of FIG. 4 with the cassette in operating position.
Figure 10:
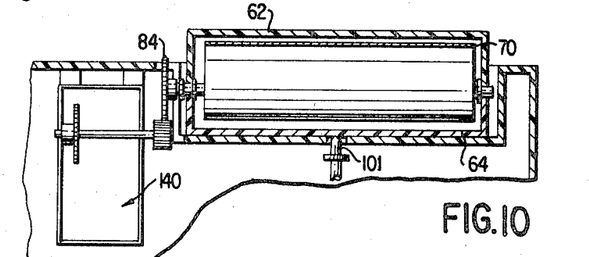
FIG. 10 is a fragmentary side elevational view, partly in section, illustrating the cassette operating means and taken along the line 10—10 of FIG. 9.
Figure 11:
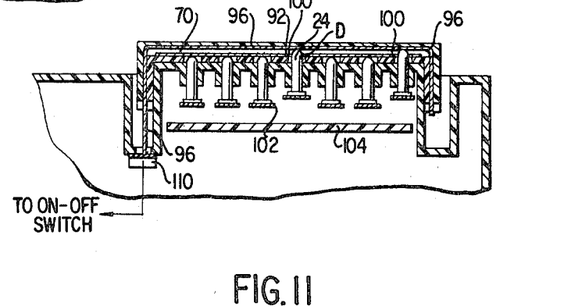
FIG. 11 is a fragmentary side elevational view, partly in section, illustrating the interdigitating relationship between the housing circuitry and tape program, taken along line 11—11 of FIG. 9.

The cassette 18 is positioned in the hollows of the housing cover 16 against a spring-operated finger 101 in a manner best illustrated in FIGS. 9–11. In FIGS. 9–11, the relationship between the housing circuitry and tape program is shown. Thus, in FIG. 11, two of the prongs 24 make electrical contact with conductor 96 by penetrating the cassette holes 92 and the tape cutouts 100 at positions previously designated as A and D. All other prongs are electrically separated from conductor 96 by virtue of the interposition of the tape 70 therebetween.

Figure 4:
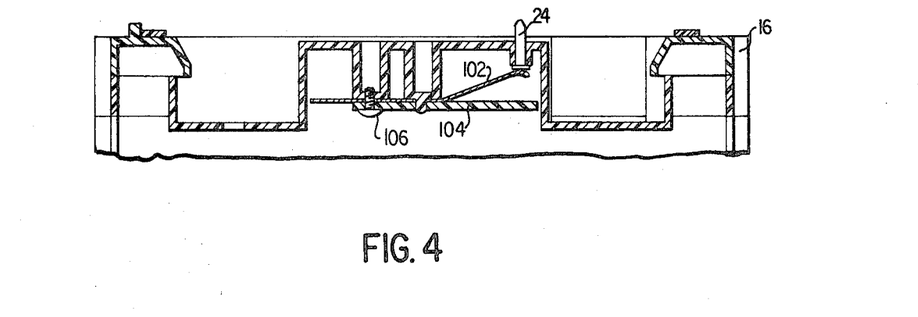
FIG. 4 is a transverse elevational view of the housing cover and a portion of the base partly sectioned to illustrate the cassette receiving cavity portion, taken along the line 4—4 of FIG. 3 but with the cover in its normal upright position.

Each prong 24 is carried by a metal spring contact 102 secured against a cover plate 104 removably positioned by screws 106 to the underside of the cover 16 as seen in FIGS. 4 and 9.

Referring now to FIGS. 3, 11 and 16, each of the spring contacts 102 is appropriately connected in series to one of the stationary contacts 47 by wires 106. Conductor 96, extending downwardly from the cassette 18 communicates with the housing circuitry at metal flap 110. The toy 10 is powered by standard D type batteries which fit in a recess (not shown) under the base 16. Battery terminal 120 connects the on-off switch 26 by wire 122. Terminal 124 has one leg 126 connected to motor 128 and another leg 130 secured to metal flap 110 contacting the cassette 18. The motor leg 132 connects to a conventional, normally closed relay 134 which communicates with on-off switch 26 through wire 136, thus completing the motor circuit. Without the cassette, but with batteries in place, the motor 128 is manually activated by switch 26.

Further, the motor 128 is automatically deactivated by energizing the relay coil 138 (not visible) which opens relay switch 134. Relay coil 138 is energized when the cassette circuit and the keyboard circuit are completed.

Figure 5:
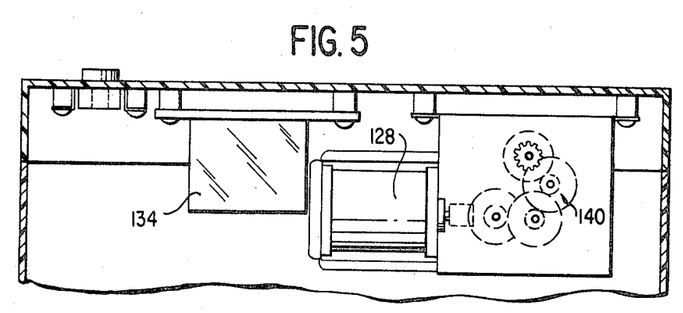
FIG. 5 is a transverse elevational view of the housing cover and a portion of the base partly sectioned to illustrate the motor-gear box assembly, taken along line 5—5 of FIG. 3, but with the cover in its normal upright position.

In use the sequence of operation may be described as follows:

1. The cassette 18 is first inserted in the housing 12 with the tape 70 in "teaching" position;
2. The on-off switch 26 is turned to "on";
3. The tape 70 then automatically advances to a first position (position II shown in FIG. 15) by motor 128 operating on the cassette gear 84 through a conventional gear box assembly 140; the details of which are shown in FIGS. 3 and 5 without any further description being necessary. The tape 70 automatically stops at position II when prongs 24 penetrate the tape 70 at the cutouts 100 corresponding to position II to energize relay coil 138. Thus, problem No. 1, e.g., 1+1=?, is in aligned relationship with window 88, as shown in FIG. 1. The prongs 24 which contact conductor 96 correspond to the positions A and E as superimposed on the tape 70 of FIG. 15.

4. When the child believes he has the correct answer to the problem posed through the window 88, he or she next depresses the appropriate button 30 to register the answer. In this example, 1+1=?, the correct button is No. 2. When button No. 2 is depressed, relay 138 is de-energized closing switch 134 to activate motor 128 and advance the tape 70. No other button will register the correct answer to activate motor 128.

5. The tape is automatically advanced to a position where the next adjacent problem is brought into registry with the window 88 in the cassette 18. The correct answer, shown at the bottom of the tape (FIG. 15) is displayed momentarily during the tape advance. The tape advance is halted by prongs 34 penetrating cutouts 100, adjacent the next problem, thereby deactivating the motor 128, as described above.

6. The above-described sequence is continued until all the problems displayed on the tape 70 are completed, after which the motor is deactivated by cutouts located at position XX of FIG. 15.

7. To rewind the tape 70, the cassette 18 is removed and reinserted in an upside down position, whereby the tape 70 is automatically caused to fully rewind and then shut off. As will be apparent, when the cassette is reversed, the cutouts 100 are no longer in an aligned orientation with the prongs 24, but are displaced therefrom sufficiently to prevent the prongs from entering the cutouts 100. However, at the end of the rewind, i.e., position I shown in FIG. 15, the cutouts are provided in aligned orientation to terminate the rewind operation.

Figure 17:
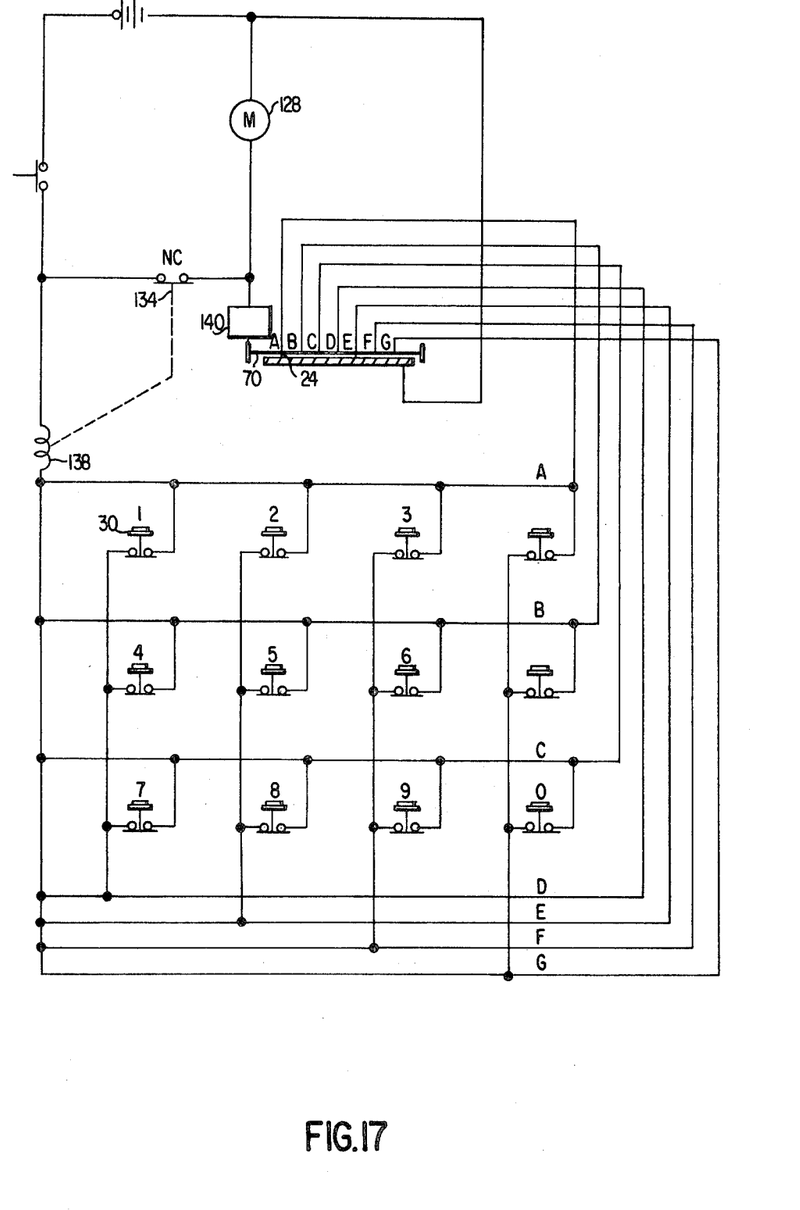
FIG. 17 is a more detailed wiring diagram illustrating the electrical relationship of the various keyboard buttons and spring loaded prongs which selectively engage the cassette tape.

Referring now to FIG. 17, where a more detailed wiring diagram of the circuitry according to the present invention is presented with each button 30 being marked to correspond to FIG. 1 and schematically connected to the appropriate prong 24, as in FIG. 3, the prongs 24 are designated A through G corresponding to their position relative to the width of the tape 70 as depicted in FIG. 15. Each button 30 acts on a predetermined pair of matrix strips 40 with each strip making up a part of a particular prong circuit. To illustrate, the problem 1+1=? at position II of FIG. 15 is again referred to. The tape cutouts 100, i.e., holes, are provided at positions A and E energizing the corresponding prong circuit of FIG. 17. It is therefore noted that the correct answer button No. 2, when depressed, opens both the prong circuit A and prong circuit E, activating motor 128 in the manner described hereinabove.

It will be apparent that the present invention is not limited to particular circuitry employed. The board can readily be expanded to include different combinations of matrices and switch components. The essential concepts described hereinabove permit the use of coded tape cassettes for teaching basic subjects in a manner heretofore unknown. In lieu of numbers displayed on each button, words or pictures displayed on replaceable caps can be provided for securement to the buttons in combination with cassettes teaching spelling, geography or the like.

I claim:

1. Educational apparatus comprising:
   a. cassette means for movably receiving a web provided with a series of indicia representing problems to be solved and having therein cut-out portions defining coded answers to the problems, said cassette means comprising means for defining a first set of openings aligned with said cut-out portions, means for defining a second set of openings misaligned with respect to said cut-out portions, and a conductive member;

b. housing means adapted to receive said cassette means;

c. selectively energizable advance means capable of being engaged and disengaged from said cassette means, for advancing said web;

d. actuating means for being actuated by a user to indicate his answer to a displayed problem; and e. means for selectively energizing said advance means to advance thereby said web only when said actuating means is actuated according to the correct coded answer, said energizing means including contact means disposed for selectively penetrating said cut-out portions of said web, said contact means being fixibly disposed with respect to said housing and including a plurality of contact members, each flexibly biased to penetrate said cut-out portions;

f. said housing means adapted to receive said cassette means in a first orientation wherein said contact members are disposed to penetrate said first set of openings and in a second orientation wherein said contact members are disposed to penetrate said second set of openings, said first set of openings being disposed so that selected contact members are disposable therethrough to selectively penetrate said cut-out portions to electrically engage said conductive member whereby said energizing means is actuated to de-energize said advance means, said cut-out portions being misaligned with respect to the corresponding ones of said second openings whereby said conductive member is electrically isolated by said web from said contact members and said energizing means is actuated to energize said advance means.

2. An education device, comprising:

a. a cassette including means movably securing a tape within said cassette, said tape provided with a series of indicia representing problems to be solved by the user, and means defining coded answers to said problems comprising pre-positioned cut-out portions adjacent said indicia, said cassette being provided with a plurality of openings;

b. a housing adapted to receive said cassette, including:

i. means for advancing said tape, ii. a plurality of actuating mechanisms, and iii. means removably securing said cassette within said housing;

c. means for energizing said means for advancing said tape only as said actuating mechanisms corresponding to said coded answers are activated, said means for energizing including a plurality of prongs disposed through said plurality of openings, means activating said prongs to contact said tape and penetrate said cut-out portions when in juxtaposition to said prongs, first and second electrical contact means, said first contact means engaging each of said prongs while said second contact means being adjacent said tape and on the opposite side thereof from said first contact means such that as said prongs penetrate said cut-out portions of said tape, electrical contact is made, said tape being an insulating medium.

3. Apparatus as claimed in claim 2, wherein said housing is adapted to receive said cassette in a first orientation whereby said tape is associated with said advancing means to be directed in a first direction, and in a second orientation different from said first orientation whereby said tape is associated with said advancing means to be directed in a second direction opposite to the first direction.

4. Apparatus as claimed in claim 3, wherein said tape has first and second ends respectively connected within said cassette to first and second spools, said first spool being engagable with said advancing means in said first orientation to direct said tape in the first direction, said second spool being engagable with said advancing means in said second orientation to direct said tape in the second direction.

5. Apparatus as claimed in claim 2, wherein said cassette comprises means defining a second plurality of openings misaligned with respect to said cut-out portions.

6. Apparatus as claimed in claim 5, wherein said housing is adapted to receive said cassette in a first orientation wherein said prongs are flexibly biased to penetrate through said first-mentioned plurality of openings, and in a second orientation wherein said contact members are flexibly biased to penetrate through said second plurality of openings.

7. Apparatus as claimed in claim 2, wherein said cassette includes means for defining an opening through which the indicia representing a single problem is displayed.

8. Apparatus as claimed in claim 7, wherein said cutout portions defining the coded answer to the displayed problem are aligned substantially perpendicular to the direction of movement of said web.

9. Apparatus as claimed in claim 8, wherein each of said cut-out portions corresponding to a single presented problem each serves the dual function of defining the coded answer to the presented problem and also of positioning its corresponding problem to be visible through said opening of said cassette means.

10. Apparatus as claimed in claim 8, wherein said aligned cut-out portions corresponding to a single presented problem, consist of two of said cut-out portions.

11. Apparatus as claimed in claim 8, wherein there is included more than two of said cut-out portions aligned substantially perpendicularly to the direction of movement of said web, for engaging said contact means whereby said energizing means is disabled to energize said advance means to advance said web.

12. Educational apparatus comprising:

a. an information bearing medium provided with a series of indicia representing problems to be solved by a user and cut-out portions defining coded answers to said problems;

b. housing means adapted to receive said information bearing medium;

c. advance means for advancing selectively said information bearing medium;

d. actuating means to be manipulated by the user; and e. means for energizing said advance means to advance said information bearing medium, only as said actuating means is manipulated by the user to provide the correct coded answer to the displayed problem, said energizing means comprising first circuit means including said advance means for moving said information bearing medium and first switch means operative in a first mode for applying an energizing signal to said advance means to move the information bearing medium and in a second mode for disconnecting the energizing signal from said advance means, and second circuit means including second switch means selectively actuatable by the user to indicate one possible answer of a plurality of answers to the presented problems, said second switch means disposable in a first state when actuated to indicate the correct answer to open said second circuit means to thereby dispose said first switch means in its first mode of operation to advance said information bearing medium, and in a second state to close said second circuit means and to dispose said first switch means in its second mode when said second switch means has been actuated in accordance with an incorrect answer.

13. Apparatus as claimed in claim 12, wherein said first circuit means comprises a relay having a switch element disposable between an open and closed condition, and an energizing coil disposed in said second circuit means, said second switch means when disposed in its second state applying an energizing signal to said coil to thereby open said switch element, said second switch means when in its first state, de-energizing said coil to close said switch element and to energize said advance means.

14. Apparatus as claimed in claim 12, wherein said second switch means comprises a switching matrix, said switching matrix comprising a first set of actuating members and a second set of actuating members, each of said first set of actuating members disposed to intersect at points of intersection each of said actuating members of said second set, and a plurality of operable members, each disposed to be engagable with one actuating member of said first and second sets at their point of intersection.

15. Apparatus as claimed in claim 14, wherein each actuating member of said first and second sets has first and second ends, said switching matrix comprising a common conductive member engagable with said first ends of said actuating members to make electrical contact therebetween, and a plurality of individual conductive members, each of said individual contact members disposed to be engagable with said second end of one of said actuating members to make electrical contact therebetween, each of said operable members being actuatable to engage one actuating member of both of said first and second sets to break electrical contact between said engaged actuating members and said corresponding conductive members.

16. Apparatus as claimed in claim 15, wherein there is included flexible biasing means for biasing said first and second ends of each actuating member of said first and second sets into electrical contact with said common conductive member and its corresponding individual conductive member.

17. Apparatus as claimed in claim 15, wherein said energizing means includes a plurality of flexibly biased contact members disposed to penetrate through said cut-out portions of said information bearing medium, an electrical circuit element disposed on the opposite side of said information bearing medium with respect to said plurality of contact members to be electrically engaged by those contact members penetrating through said cut-out portions, said second circuit means including said plurality of contact members and said circuit element and being electrically completed therethrough when one or more of said contact members is disposed through one of said cut-out portions to electrically engage said electrical circuit element.

* * * * *